United States Patent [19]
Rumbaugh

[11] Patent Number: 5,660,145
[45] Date of Patent: Aug. 26, 1997

[54] CHICKEN HOUSING AND EGG RECEIVING SYSTEM

[75] Inventor: Lawrence Howard Rumbaugh, Iron City, Tenn.

[73] Assignee: Michael Wayne Rumbaugh, Waynesboro, Tenn.

[21] Appl. No.: 608,773

[22] Filed: Feb. 29, 1996

[51] Int. Cl.$^6$ ................................ A01K 31/18
[52] U.S. Cl. .................. 119/440; 119/442; 119/447; 198/496
[58] Field of Search ................. 119/440, 442, 119/447, 451, 458, 479, 164; 198/493, 495, 496

[56] References Cited

U.S. PATENT DOCUMENTS

| | | | |
|---|---|---|---|
| 1,719,974 | 7/1929 | Fenner | 119/442 |
| 3,578,151 | 5/1971 | Crawford | 198/495 |
| 4,936,257 | 6/1990 | Kühlmann | 119/442 |
| 5,293,985 | 3/1994 | Alvarez | 198/496 |

*Primary Examiner*—John G. Weiss
*Assistant Examiner*—Bruce E. Snow
*Attorney, Agent, or Firm*—C. A. Phillips

[57] ABSTRACT

An egg laying assembly wherein eggs are laid onto an endless belt, and a roller at one end of the belt effects a reversal in direction of the belt, and a brush is positioned against the belt where it passes under the roller, wherein debris is loosened from the belt and vacuumed from it. The output of the vacuum system has an output into an enclosure which houses egg laying.

6 Claims, 3 Drawing Sheets

CHICKEN HOUSING AND EGG RECEIVING SYSTEM

FIELD OF THE INVENTION

This invention relates generally to a facility for egg laying and recovery and particularly to one wherein layer cleanliness and the handling of eggs is obtained while maintaining overall environmental control.

BACKGROUND OF THE INVENTION

Construction of egg laying facilities constitute a multi-mullion dollar business, and in order to ensure a disease-free region for chickens, and at the same time minimizing damage to the general environment from drippings and other debris from the chickens, considerable care must be employed. For example, in general, people who might possibly carry disease are prevented from entering egg laying facilities. At the same time, the environmental problem of handling drippings and other debris from the chickens exists, and this is particularly a problem with respect to accumulations on conveyor belts that are typically employed to remove eggs from the laying house which, of course, also receives the debris. Thus, it is important to remove both the drippings and other debris from the chickens, but not in such a way that the removal from the belt creates an environmental hazard.

SUMMARY OF THE INVENTION

In accordance with this invention, a plurality of laying nests are positioned in line over one or more looped endless belts and wherein the eggs and debris fall on an upper side of the belt and are removed by a cleaning system which includes the combination of a brush located outside of the laying house and which loosens material on a looped-back underside of the belt and a vacuum assembly which draws debris away and introduces it back into the laying house such that it falls on a floor of the laying house separated from the chickens. It is removed periodically when the laying housing is disassembled and generally cleaned.

DESCRIPTION OF THE PREFERRED EMBODIMENT

Figure 1:
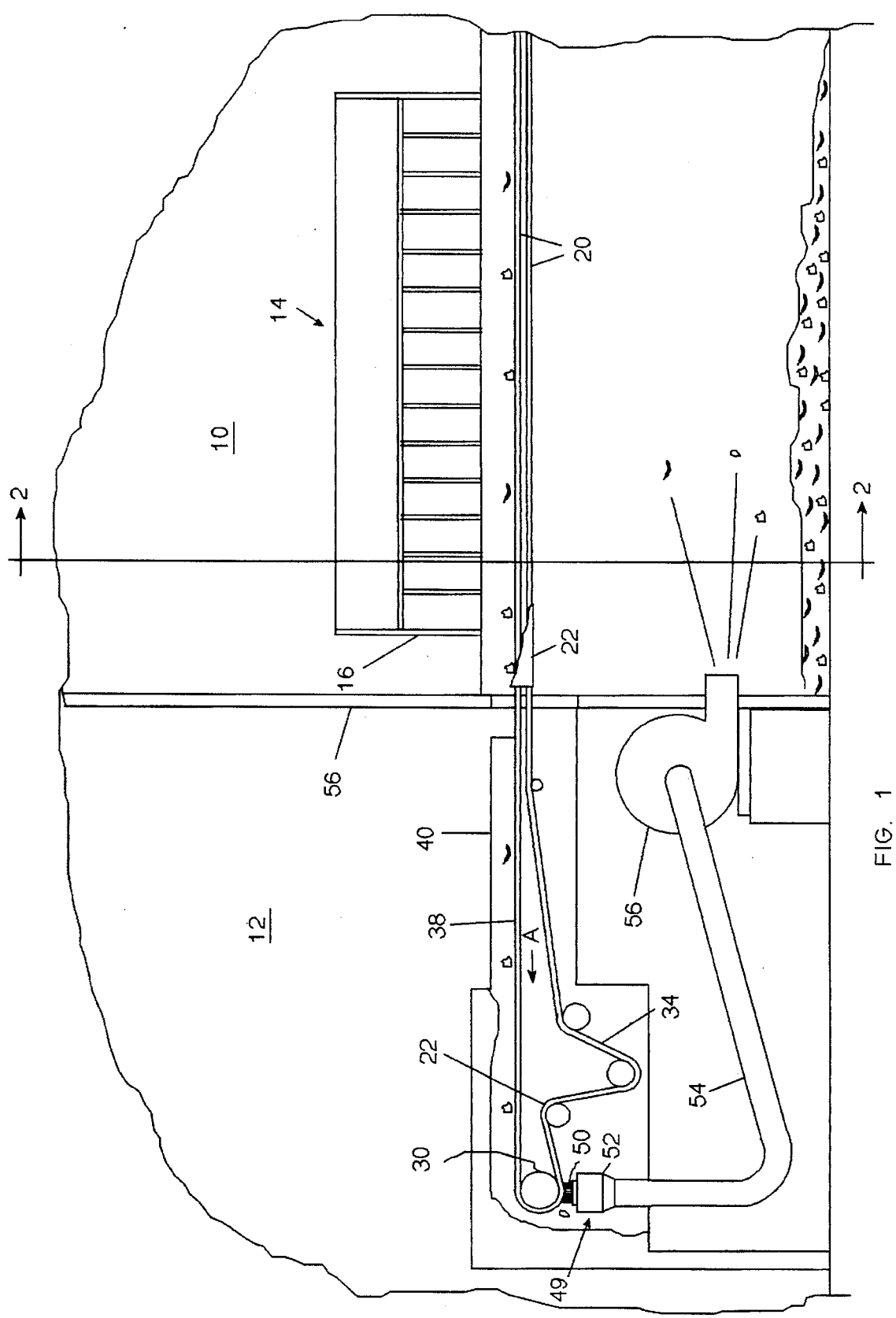
FIG. 1 is a diagrammatic elevational view of a portion of the interior of a facility for laying chickens and illustrates certain operational features of the invention.
Figure 2:
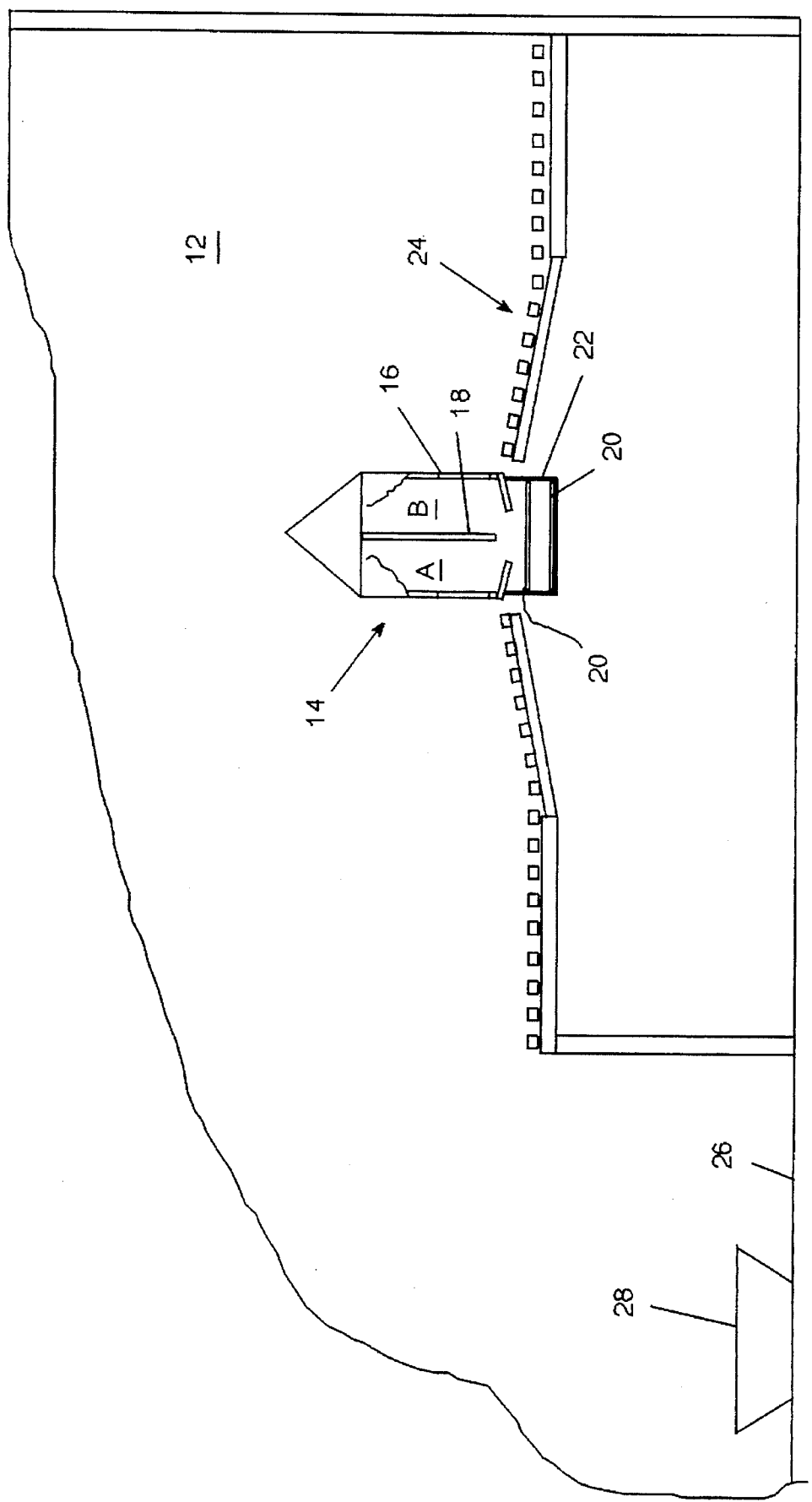
FIG. 2 is a diagrammatic, sectional view of the laying house illustrated in FIG. 1, but rotated 90°, showing the position of a laying nest housing and the relation of certain components of the laying house illustrated in FIG. 1.
Figure 3:
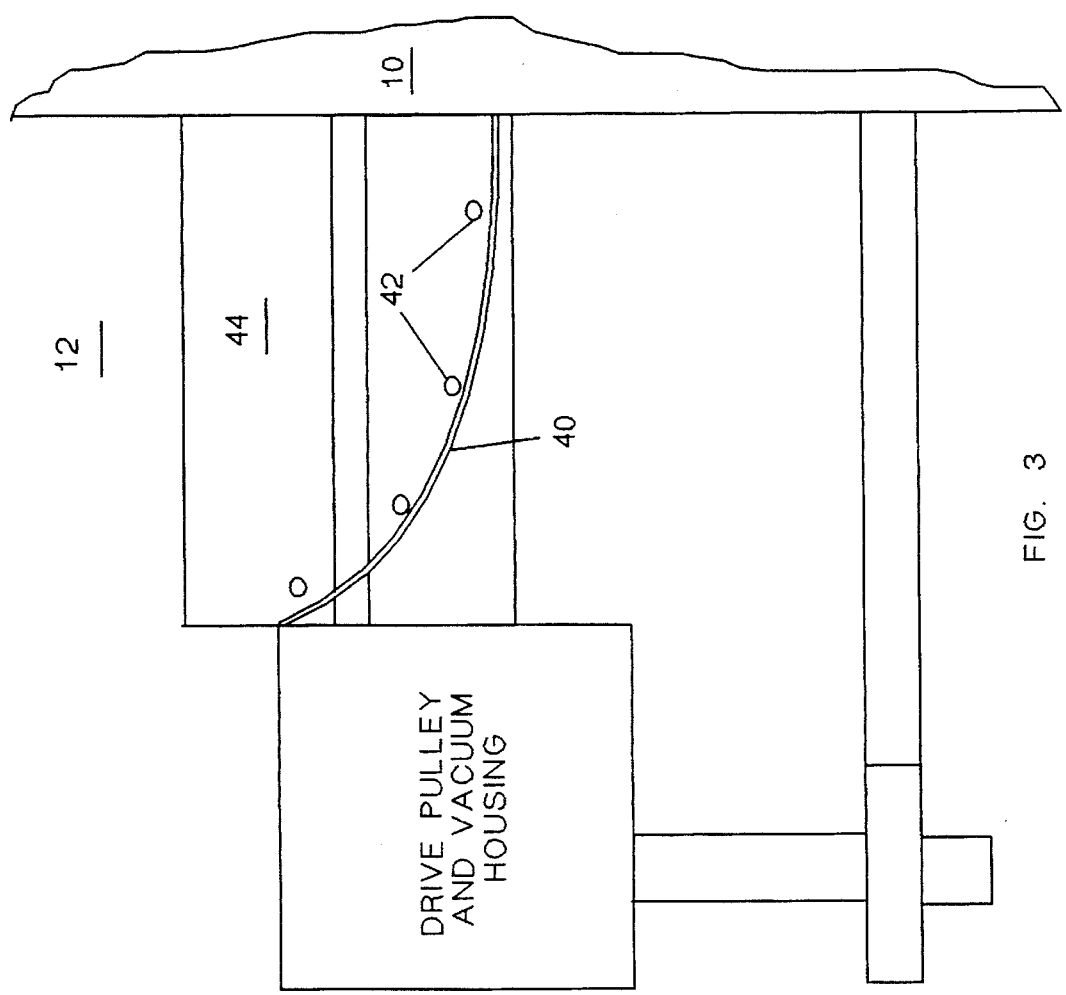
FIG. 3 diagrammatically illustrates a partial plan view of a portion of the assembly of the present invention, particularly illustrating the position of an egg removal table and cleaning and vacuuming system, all located in a separate housing adjacent to the laying house.

The overall assembly of the present invention employs two housing enclosures, a chicken laying house 10 in combination with an egg removal and cleaning equipment housing 12 as particularly illustrated in FIGS. 1 and 3. One set 14 of nesting houses is illustrated in FIGS. 1 and 2. Typically, there would be several more nesting house sets 14 in line. Each of the nesting houses 16, or compartments A and B, accommodate chickens, one on each side, as illustrated in FIG. 2. Thus, for example, with compartment sets in line as shown in FIG. 1, it is to seen that there would be provided for the laying accommodation of 18 chickens at one time. The height of the laying nest to the peak is about 27% inches, and the front-to-back distance or depth from front 16 to rear wall 18 is approximately 15½ inches in each compartment. The floor of each of the two compartments includes incline floor portions 19 wherein layed eggs gently roll down to conveyor belt 20.

An endless conveyor belt 20, having a width of approximately 8 inches, is positioned in a U-shaped trough 22, partially shown in FIG. 1, the trough and nesting houses being made as a unit wherein the nesting houses, belt, and trough may be elevated out of the way for periodic cleaning, by means not shown. One side of trough 22 is broken away in FIG. 1 to show the belt, and the nest floors F are omitted, they being shown in FIG. 2, the upper and lower position of belt 20 being nearly adjacent in trough 22, and the width of the belt being such as to extend adjacent to the side walls of trough 22.

A slatted floor 24 (FIG. 2) is positioned on each side of the nesting houses and provides a platform where chickens can gather. The floor is approximately 22 inches above ground level, and water and food are provided in containers at ground level 26 as illustrated by a container 28 in FIG. 2.

FIG. 1 particularly illustrates the overall system of this invention, and it is to be noted that belt 20 is driven by a motor (not shown) driven roller 30, being located in a separate enclosure 12, this enclosure being one which adjoins enclosure 10. Belt 20 may pass over additional idler rollers 32, 34, and 36 which typically would be frame mounted, by means not shown, to maintain a desired tension in the belt. The top side 38 of belt 20 moves in the direction shown by arrow A and basically functions to bring eggs that have been deposited on the belt from the chickens laying in the nests shown in FIG. 1. They are thus moved to enclosure 12.

Referring to FIG. 3, a guide 40 is positioned over belt 20 and is slightly spaced from the belt such that it captures eggs 42 and moves them over to a receiving table 44 where a person picks up the eggs, examines them for any defects, and places the good ones in a shipment box. Belt 20 continues on and over motor driven roller 30 and back into the laying house, being supported at an opposite end by an idler roller (not shown) over which belt 20 passes and returns in the direction of arrow A.

Figure 4:
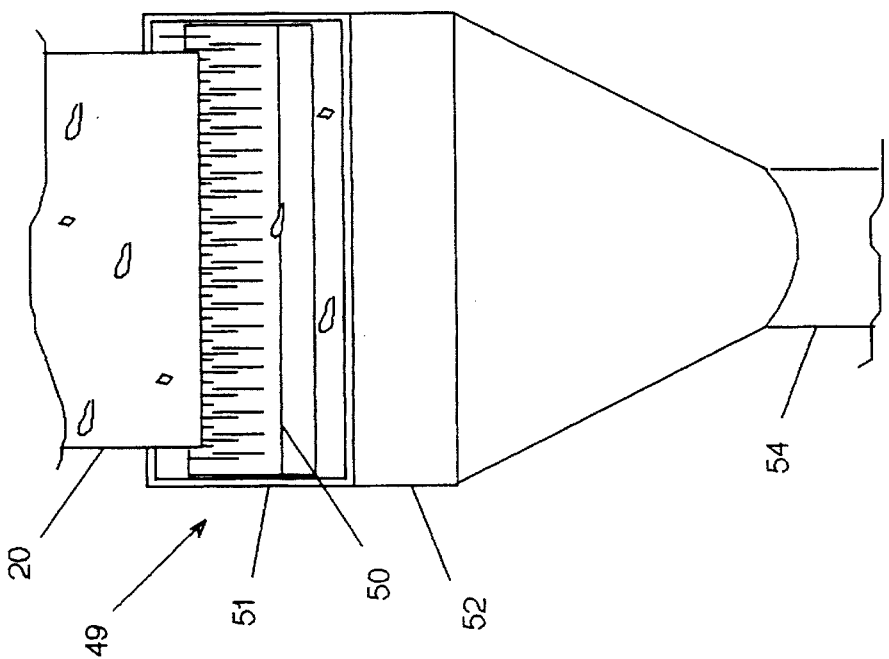
FIG. 4 is a cut-away view of the vacuum head and brush assembly of the invention.

Just under roller 30 (not shown in FIG. 4) there is positioned a brush and vacuum head assembly 49 (FIG. 4) which includes a brush 50 for loosening debris on the underside of belt 20. Brush 50 is mounted in an open end 51 of a plenum 52, which plenum is connected to a pipe 54 which connects to the intake of a motor driven blower 56 (FIG. 1). Blower 56 draws in air around brush 50 and thus draws in debris loosened by brush 50. The outlet of blower 56 passes through a wall 58 of laying house or enclosure 10 and thus blows debris onto the floor 26 of laying house 10. The debris accumulates on this floor under the slatted floor 24, at ground level, until a general cleaning of laying house 10 is effected, which is typically done every 40 weeks.

Thus, the debris from the chicken house is not simply deposited outside of the chicken house where it could create an environmental hazard, and at the same time it is material which is indigenous to the chickens themselves and does not appear harmful to them and thus may be stored temporarily within the laying house enclosure as shown.

Having thus described my invention, what I claim is:

1. A chicken housing and egg receiving system comprising:
   a chicken housing assembly including a plurality of laying nests extending generally in a row;
   an egg receiving housing assembly separate from said chicken housing assembly;
   a looped conveyor belt running in a position under and along said laying nests and extending into said egg receiving housing, said belt being operated by a roller around which said belt passes, and having a surface for receiving eggs from said laying nests and delivering them to said egg receiving housing assembly;
   a drive assembly for supporting and driving said belt to said egg receiving housing; and
   a cleaning assembly separated from said chicken housing assembly comprising:
      a brush positioned proximate to one end region of travel of said belt and positioned below and engaging an underside of said belt for loosening debris, and
      a vacuum assembly having an input coupled to said underside of said belt adjacent to said brush for drawing said debris and having an output coupled to said chicken housing wherein said debris is caused to be returned to said chicken housing assembly and stored in said chicken housing assembly and not ejected into the environment.

2. The system as set forth in claim 1 wherein said drive assembly includes a roller supporting said belt, and said brush is positioned against said belt under said roller.

3. The system as set forth in claim 2 wherein said roller is a drive roller.

4. The system as set forth in claim 3 wherein said roller is positioned outside said egg receiving housing.

5. The system as set forth in claim 4 wherein a slatted floor extends outward from said laying nests, and said output of said vacuum assembly deposits debris under said slatted floor.

6. The system as set forth in claim 1 wherein said belt travels through a trough positioned under said laying nests.

* * * * *